United States Patent
Yoshiura

(10) Patent No.: US 11,371,674 B2
(45) Date of Patent: Jun. 28, 2022

(54) PROTECTION STRUCTURE OF REAR COMBINATION LAMP

(71) Applicant: SUZUKI MOTOR CORPORATION, Hamamatsu (JP)

(72) Inventor: Toshiaki Yoshiura, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/388,768

(22) Filed: Jul. 29, 2021

(65) Prior Publication Data

US 2022/0042667 A1 Feb. 10, 2022

(30) Foreign Application Priority Data

Aug. 7, 2020 (JP) .............................. JP2020-134389

(51) Int. Cl.
| | |
|---|---|
| *B62J 6/045* | (2020.01) |
| *B62J 15/00* | (2006.01) |
| *B62K 11/00* | (2006.01) |
| *F21S 43/50* | (2018.01) |
| *F21S 43/19* | (2018.01) |

(52) U.S. Cl.
CPC .............. *F21S 43/50* (2018.01); *B62J 6/045* (2020.02); *B62J 15/00* (2013.01); *F21S 43/195* (2018.01); *B62K 11/00* (2013.01)

(58) Field of Classification Search
CPC . B62K 11/00; B62J 15/00; B62J 6/045; F21S 43/195; F21S 43/50
See application file for complete search history.

(56) References Cited

U.S. PATENT DOCUMENTS

| | | | | |
|---|---|---|---|---|
| 2009/0108557 A1* | 4/2009 | Kobayashi | ............... | B62J 15/00 280/152.1 |
| 2020/0096168 A1* | 3/2020 | Matsumoto | .............. | B62J 15/00 |

FOREIGN PATENT DOCUMENTS

| | | | | |
|---|---|---|---|---|
| CN | 112519944 A | * | 3/2021 | |
| JP | 2002-29475 A | | 1/2002 | |
| JP | 2004-74915 A | | 3/2004 | |
| JP | 4104344 B2 | | 6/2008 | |
| TW | 201339037 A | | 10/2013 | |
| WO | WO-2015045115 A1 | * | 4/2015 | ........... B60Q 1/0005 |

OTHER PUBLICATIONS

Extended European Search Report dated Dec. 14, 2021, issued by the European Patent Office in corresponding application EP 21189237.7.

* cited by examiner

*Primary Examiner* — Anabel Ton
(74) *Attorney, Agent, or Firm* — Stein IP, LLC

(57) ABSTRACT

There is provided a protection structure of a rear combination lamp provided at a rear portion of a straddle-type vehicle. The protection structure of the rear combination lamp includes: an undercover covering the rear combination lamp from below; and a rear fender covering a rear wheel from above, the rear fender being below the undercover. The undercover extends along a lower edge of the rear combination lamp. A size of the rear fender in a vehicle width direction is smaller than a size of the undercover in the vehicle width direction in a vehicle rear view.

9 Claims, 8 Drawing Sheets

PROTECTION STRUCTURE OF REAR COMBINATION LAMP

CROSS-REFERENCE TO RELATED APPLICATIONS

This application is based on Japanese Patent Application No. 2020-134389 filed on Aug. 7, 2020, the contents of which are incorporated herein by way of reference.

BACKGROUND

The present invention relates to a protection structure of a rear combination lamp.

A rear combination lamp including a plurality of assembled lamps is generally provided at a rear portion of a straddle-type vehicle such as a motorcycle. In the related art, there has been proposed a structure in which a rear fender is installed below a rear combination lamp to protect the rear combination lamp from mud or the like splashed by a rear wheel (for example, see Patent Literature 1). The rear fender described in Patent Literature 1 extends rearward from a lower edge of the rear combination lamp and covers an upper side of the rear wheel. With the rear fender, mud or the like is prevented from adhering to the rear combination lamp and visibility of the lamp is ensured.

[Patent Literature 1] Japanese Patent No. 4104344

Since the rear combination lamp includes a plurality of integrated lamps, the rear combination lamp has a large size in the vehicle width direction. In order to protect the entire rear combination lamp by the rear fender, it is necessary to increase the size of the rear fender, and the degree of freedom of the shape of the rear fender is also reduced. An increase in the size of the rear fender also deteriorates the appearance of a vehicle.

The present invention has been made in view of the above circumstance, and an object of the present invention is to provide a protection structure of a rear combination lamp that can improve the protection performance of the rear combination lamp while preventing a decrease in the appearance of a vehicle.

SUMMARY

To solve the problem described above, according to an aspect of the present invention, there is provided a protection structure of a rear combination lamp provided at a rear portion of a straddle-type vehicle. The protection structure of the rear combination lamp includes an undercover covering a rear combination lamp from below, and a rear fender covering a rear wheel from above, the rear fender being below the undercover. The undercover extends along a lower edge of the rear combination lamp. A size of the rear fender in a vehicle width direction is smaller than a size of the undercover in the vehicle width direction in a vehicle rear view.

DESCRIPTION OF EMBODIMENTS

In a protection structure of a rear combination lamp according to an aspect of the present invention, a rear combination lamp provided at a rear portion of a straddle-type vehicle is covered from below by an undercover along a lower edge of the rear combination lamp. Below the undercover, a rear wheel is covered with a rear fender from above. Even when the size of the rear fender in the vehicle width direction is smaller than the size of the undercover in the vehicle width direction, the rear combination lamp is protected from mud or the like splashed by the rear wheel. By protecting the rear combination lamp with the undercover and reducing the size of the rear fender, it is possible to improve the protection performance of the rear combination lamp while preventing deterioration of the appearance of the vehicle.

Embodiments

Figure 1:
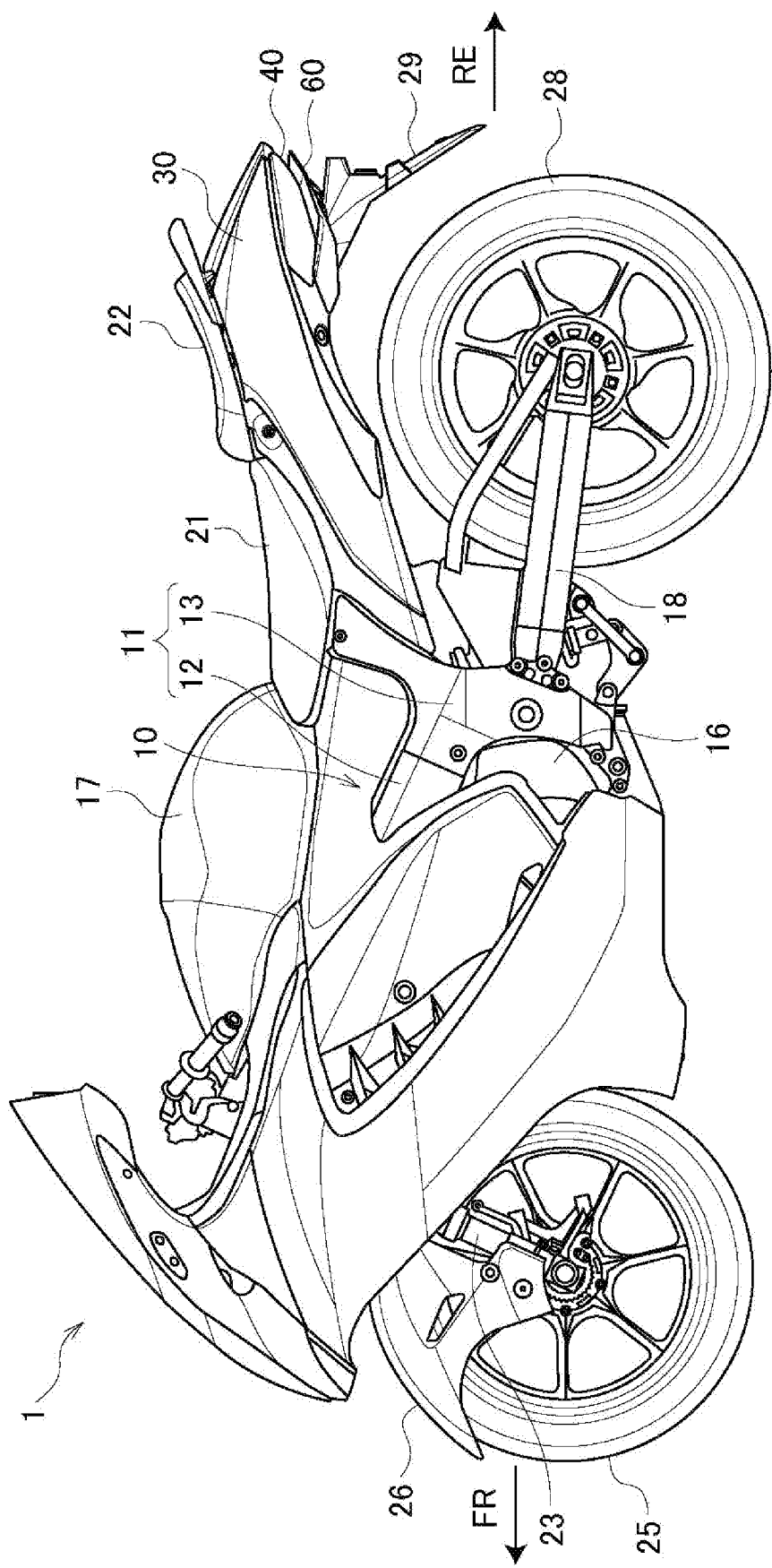
FIG. 1 is a left view of a straddle-type vehicle according to a present embodiment.

Hereinafter, a present embodiment will be described in detail with reference to the accompanying drawings. FIG. 1 is a left view of a straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 includes various components such as an engine 16 and an electrical system that are mounted on a twin spar-type vehicle body frame 10 formed by aluminum casting. The vehicle body frame 10 includes a pair of main frames 11 branching from a head pipe (not shown) to the left and right and extending rearward, and a pair of down frames (not shown) branching from the head pipe to the left and right and extending downward. A rear portion of the engine 16 is supported by the pair of main frames 11, and a front portion of the engine 16 is supported by the pair of down frames. By supporting the engine 16 with the vehicle body frame 10, the rigidity of the entire vehicle is ensured.

Front portions of the pair of main frames 11 serve as tank rails 12 located above the engine 16, and a fuel tank 17 is supported by the tank rails 12. Rear portions of the pair of main frames 11 serve as body frames 13 located in rear of the engine 16, and swing arms 18 are swingably supported in substantially middle positions of the body frames 13 in the upper-lower direction. Seat rails 14 (see FIG. 5) and a back stay extend rearward from upper portions of the body frames 13. A rider seat 21 and a pillion seat 22 are supported on the seat rails 14 in rear of the fuel tank 17.

A pair of front forks 23 are steerably supported on the head pipe via a steering shaft (not shown). A front wheel 25 is rotatably supported by lower portions of the front forks 23, and an upper portion of the front wheel 25 is covered with a front fender 26. The swing arms 18 extend rearward from the body frames 13. A rear wheel 28 is rotatably supported at rear ends of the swing arms 18, and an upper side of the rear wheel 28 is covered with a rear fender 29. The engine 16 is coupled to the rear wheel 28 via a chain drive-type speed reduction mechanism, and power from the engine 16 is transmitted to the rear wheel 28 via the speed reduction mechanism.

The straddle-type vehicle 1 is covered with various covers serving as a vehicle body exterior. For example, a vehicle rear portion is covered with a frame cover 30, and a rear combination lamp 40 is provided on a rear side of the frame cover 30. The rear combination lamp 40 is located above the rear wheel 28, and mud or the like is splashed from the rear wheel 28 toward the rear combination lamp 40. Although the upper side of the rear wheel 28 is covered with the rear fender 29, it is difficult for the rear fender 29 to prevent mud or the like from adhering to the rear combination lamp 40 having a large size in the vehicle width direction. In particular, the rear fender 29 tends to be reduced in size from the viewpoint of improving the appearance of a vehicle in recent years.

Although mud or the like can be prevented from adhering to the rear combination lamp 40 with a large rear fender, the degree of freedom of the shape of the rear fender may reduce, the appearance of the vehicle rear portion may deteriorate, and the weight of the rear fender may increase. Therefore, in the present embodiment, an undercover 60 is attached along a lower edge of the rear combination lamp 40 so that the rear combination lamp 40 can be protected from mud or the like splashed to the rear wheel 28 even when the small rear fender 29 is used. The rear combination lamp 40 is covered by the undercover 60 from below, and mud or the like is prevented from adhering to the rear combination lamp 40.

Figure 2:
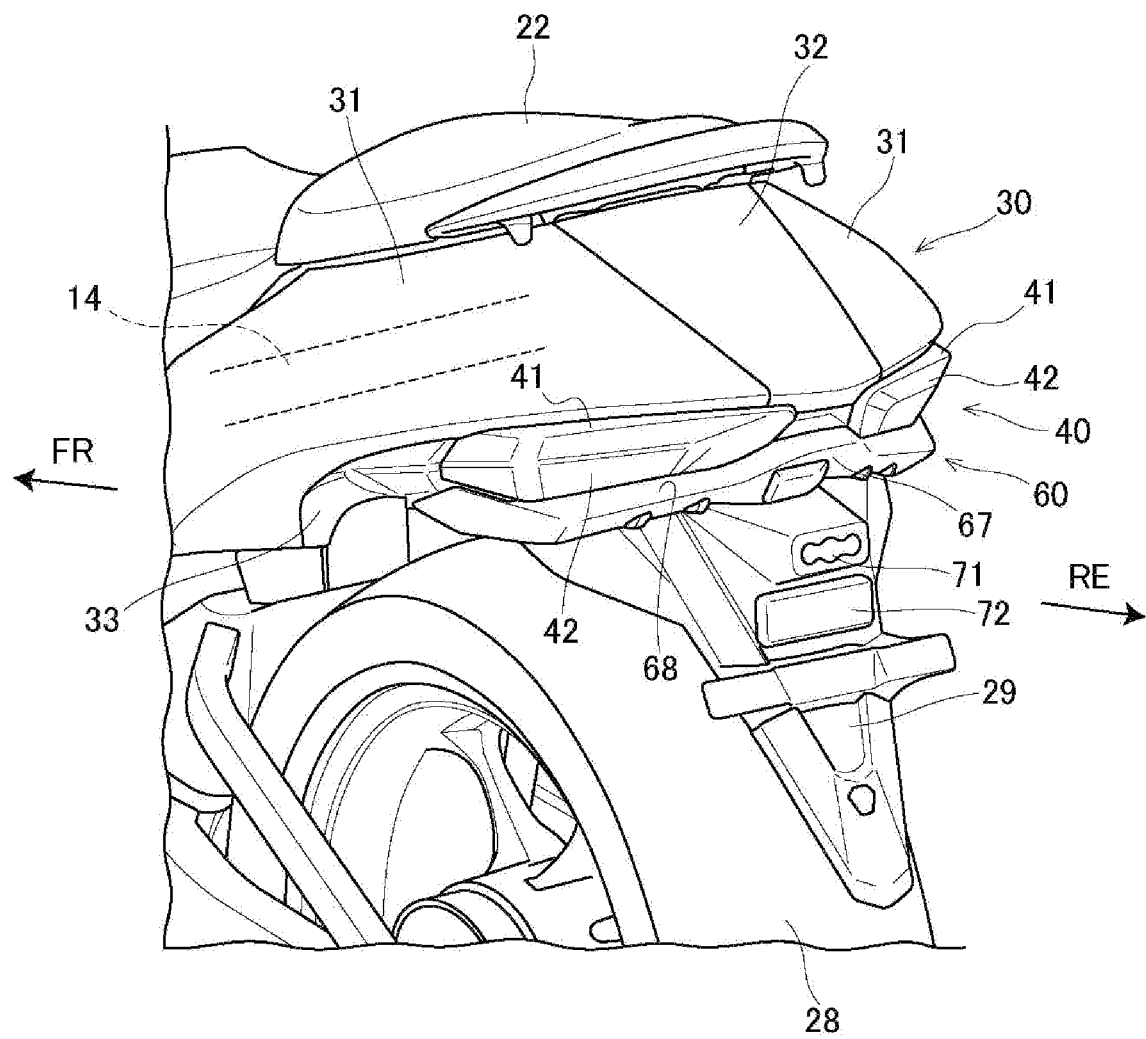
FIG. 2 is a perspective view of a vehicle rear portion according to the present embodiment.
Figure 3:
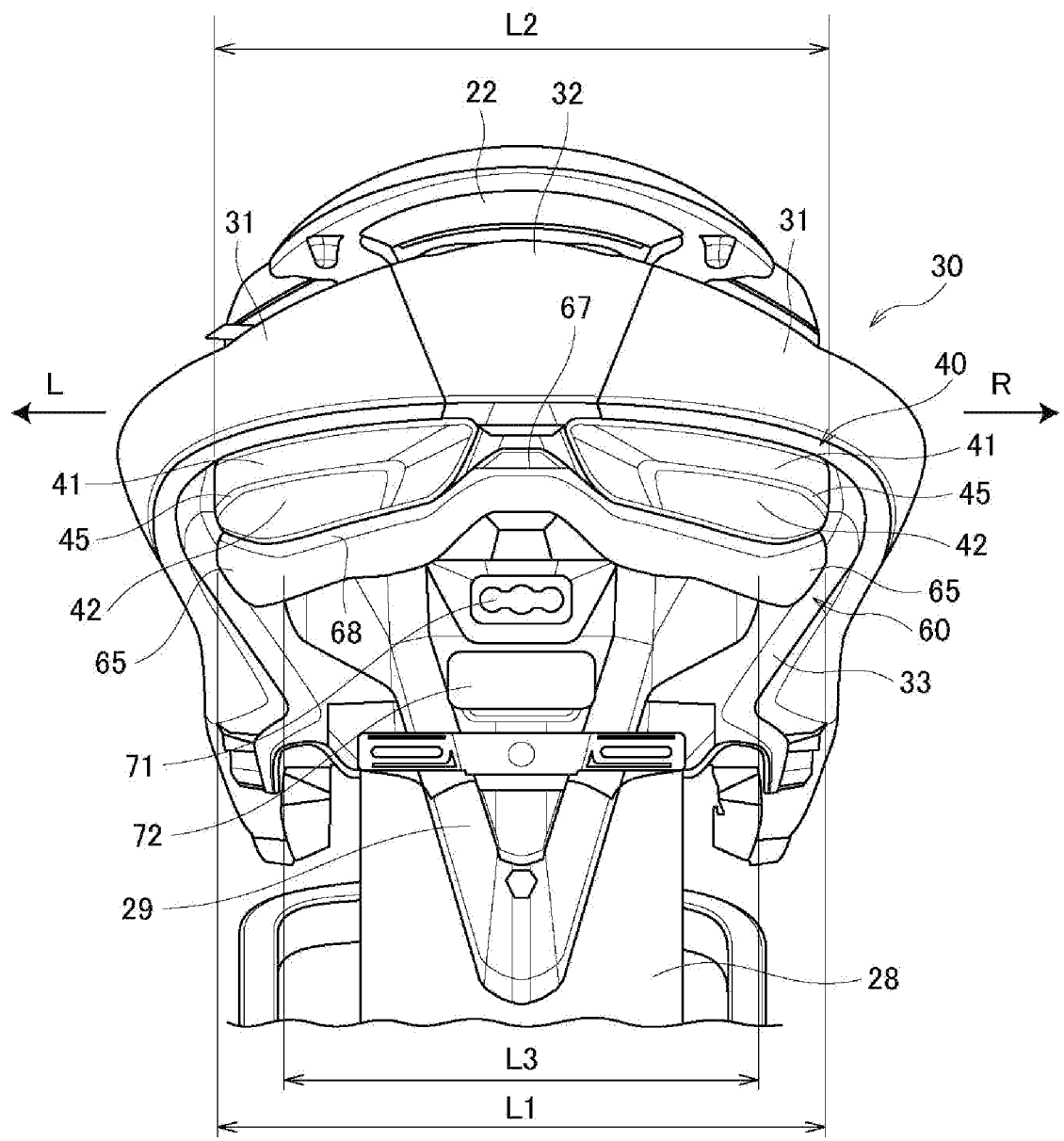
FIG. 3 is a rear view of the vehicle rear portion according to the present embodiment.
Figure 4:
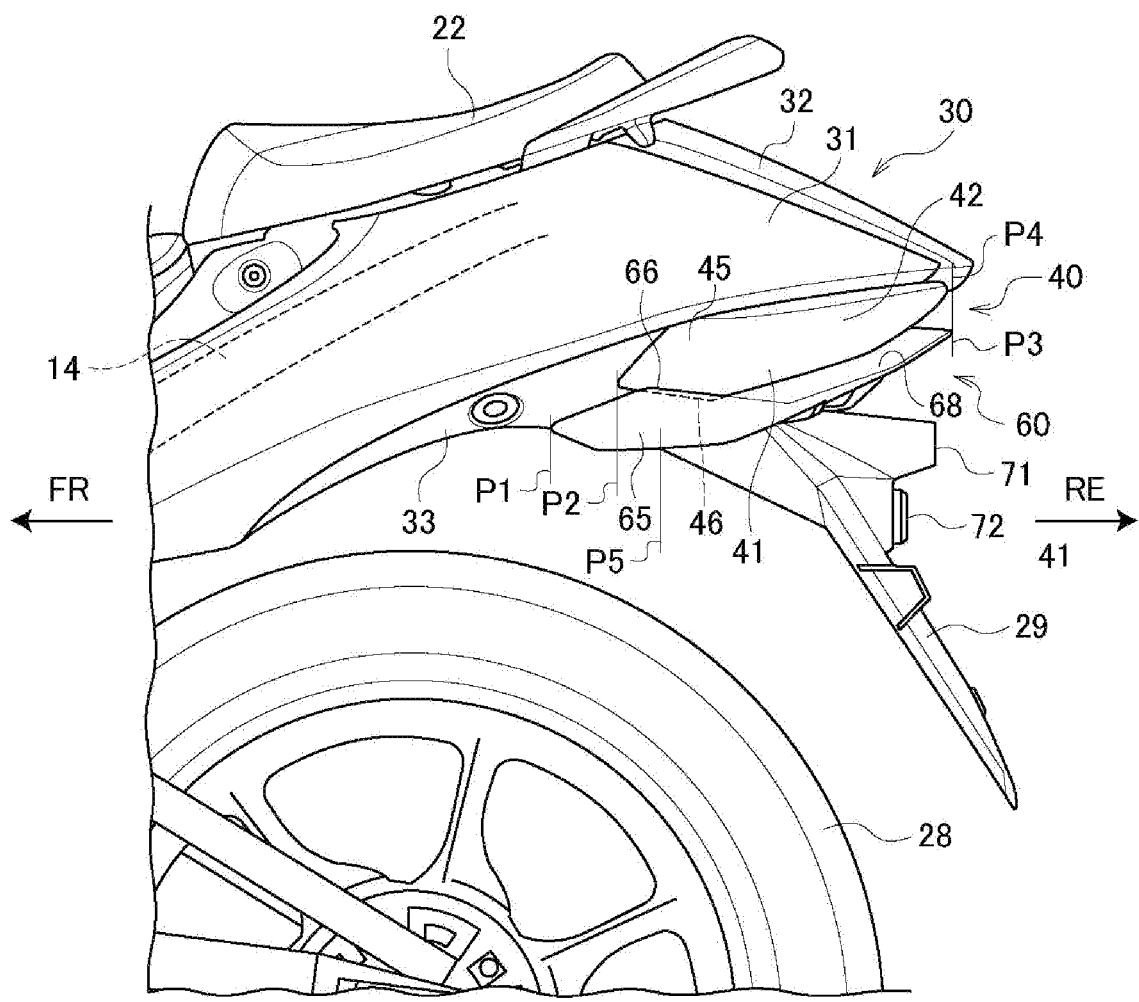
FIG. 4 is a side view of the vehicle rear portion according to the present embodiment.
Figure 5:
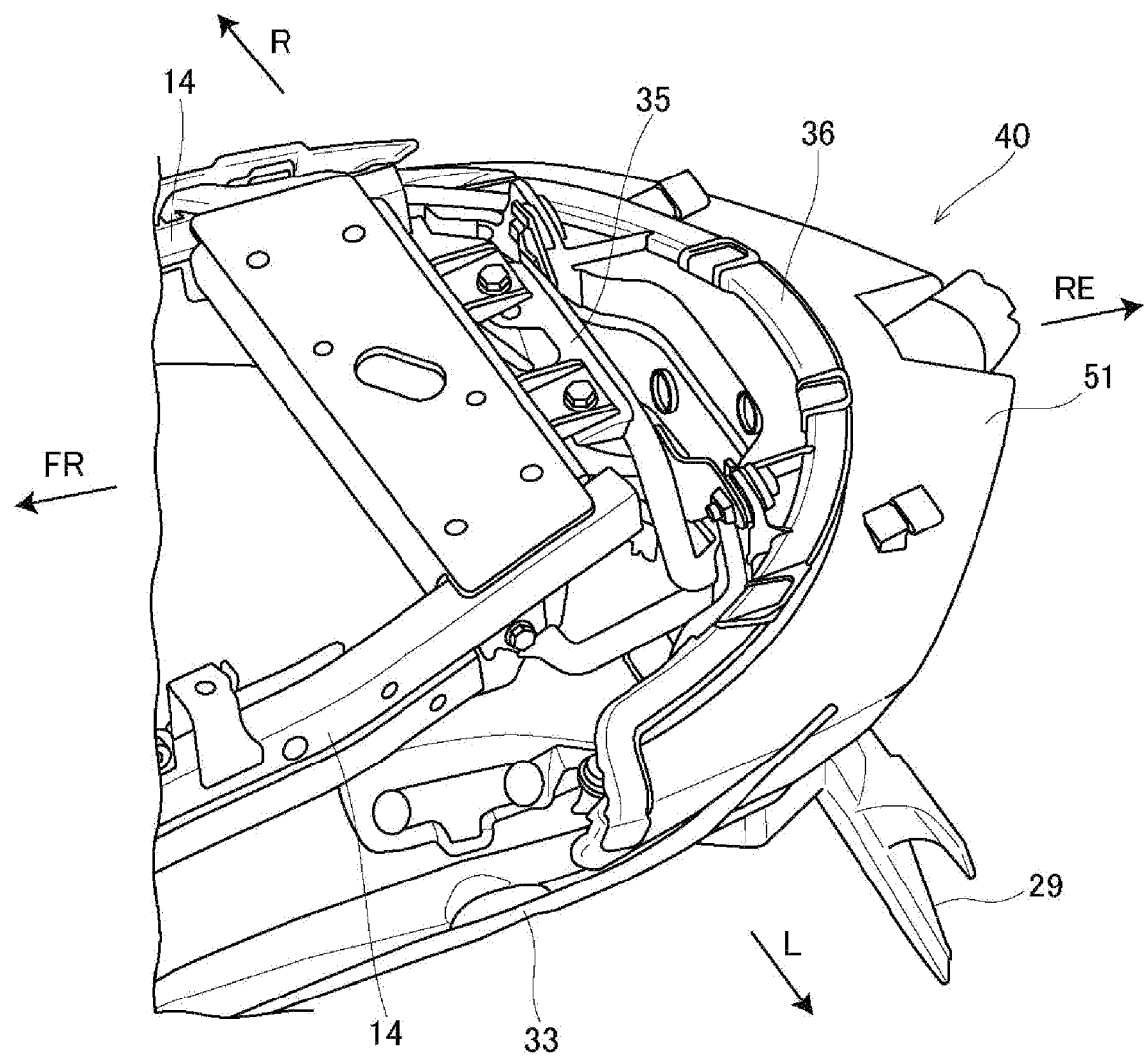
FIG. 5 is a perspective view according to the present embodiment in which an upper side of the vehicle rear portion is open.
Figure 6:
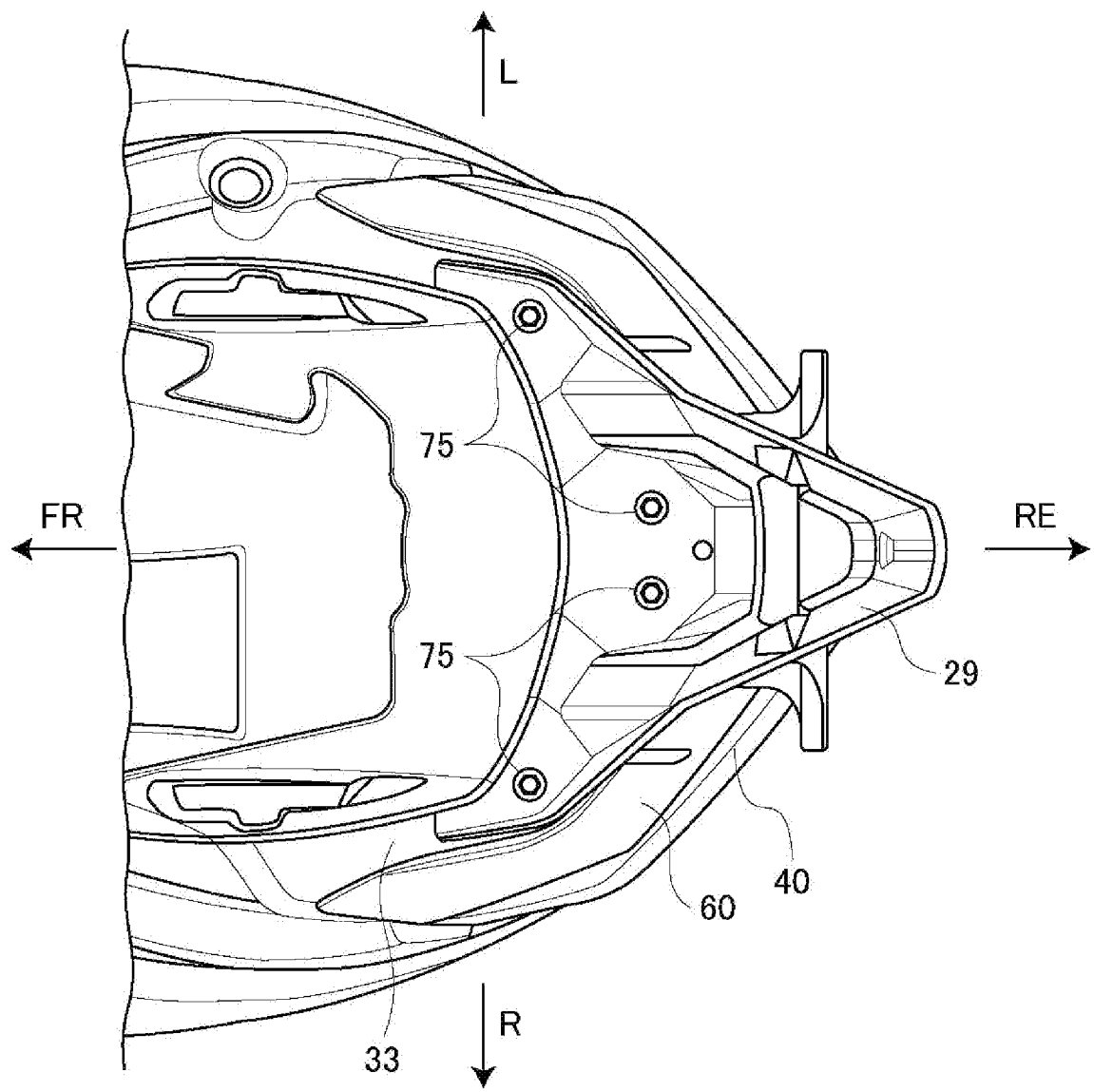
FIG. 6 is a bottom view of the vehicle rear portion according to the present embodiment.

Hereinafter, a protection structure of a rear combination lamp of the straddle-type vehicle will be described with reference to FIGS. 2 to 6. FIG. 2 is a perspective view of the vehicle rear portion according to the present embodiment. FIG. 3 is a rear view of the vehicle rear portion according to the present embodiment. FIG. 4 is a side view of the vehicle rear portion according to the present embodiment. FIG. 5 is a perspective view according to the present embodiment in which an upper side of the vehicle rear portion is opened. FIG. 6 is a bottom view of the vehicle rear portion according to the present embodiment.

As shown in FIGS. 2 to 4, the pair of seat rails 14 at the vehicle rear portion are covered by the frame cover 30. The frame cover 30 includes a pair of side covers 31 covering side portions of the seat rails 14, a center cover 32 connecting the pair of side covers 31 in rear of the pillion seat 22, and a lower cover 33 connecting the pair of side covers 31 below the seat rails 14. The frame cover 30 is constituted by these upper, lower, left, and right cover members, and the rear combination lamp 40 including a plurality of assembled lamps is exposed from an opening on a rear surface side of the frame cover 30.

The rear combination lamp 40 includes a pair of left and right lamp portions 41 with a space therebetween. The lamp portions 41 are installed along corresponding lower edges of the side covers 31, and the lamp portions 41 are connected to a rear side of the lower cover 33 in a side view (see FIG. 4), and thereby the rear combination lamp 40 and the frame cover 30 are formed in a design having a sense of unity. Each of the pair of lamp portions 41 extends forward from the vicinity of the center of a vehicle rear end and outward in the vehicle width direction. The lamp portions 41 have large sizes in the vehicle width direction in a vehicle rear view, and thus the lamp portions 41 are easy to be recognized from a vehicle rear side.

The undercover 60 is provided below the rear combination lamp 40. The undercover 60 protrudes from a lens surface 42 of the rear combination lamp 40, and the rear combination lamp 40 is covered from below by the eaves-shaped undercover 60. The undercover 60 extends along the lower edge of the rear combination lamp 40 in a wider range than the rear combination lamp 40. The undercover 60 appropriately protects the rear combination lamp 40 from mud or the like splashed by the rear wheel 28.

The rear fender 29 is provided below the undercover 60. The rear fender 29 extends in an arch shape along the rear wheel 28 in a side view (see FIG. 4), and the rear wheel 28 is covered from above by the rear fender 29. The rear fender 29 prevents mud from splashing and foreign matters from being caught in the rear wheel 28. The rear fender 29 is formed in a triangular shape whose size in the vehicle width direction decreases downward in a rear view (see FIG. 3). A license plate lamp 71 is provided at the center of an upper portion of the rear fender 29, a reflector 72 is provided below the license plate lamp 71, and a license plate (not shown) is provided below the reflector 72.

Here, a position relationship among the rear combination lamp 40, the undercover 60, and the rear fender 29 will be described. In the vehicle rear view (see FIG. 3), a size L1 of the undercover 60 in the vehicle width direction is the same as or slightly larger than a size L2 of the rear combination lamp 40 in the vehicle width direction. A size L3 of the rear fender 29 in the vehicle width direction is smaller than the size L1 of the undercover 60 in the vehicle width direction. Accordingly, even when the size of the rear fender 29 in the vehicle width direction is small, the rear combination lamp 40 is protected from mud or the like scattering from the vehicle rear side with the undercover 60.

In a vehicle side view (see FIG. 4), a foremost position P1 of the undercover 60 is located forward of a foremost position P2 of the rear combination lamp 40, and a rearmost position P3 of the undercover 60 is located in the same position as a rearmost position P4 of the rear combination lamp 40 in the front-rear direction. The rearmost position P4 of the rear combination lamp 40 is located in the same position as a rear end of the rear wheel 28 in the front-rear direction. In the vehicle side view, the foremost position P1 of the undercover 60 is located forward of a foremost position P5 of the rear fender 29. Accordingly, even when the size of the rear fender 29 in the front-rear direction is small, the rear combination lamp 40 is protected from mud or the like scattering from vehicle side portions with the undercover 60.

In the present embodiment, that sizes in the vehicle width direction are the same is not limited to that the sizes are completely equal, and may include an error to such an extent that the sizes can be regarded as substantially equal. In the present embodiment, the same position in the front-rear direction is not limited to being completely the same position, and may include an error to such an extent that the position can be regarded as substantially the same. In the present embodiment, the rearmost position P3 of the undercover 60 is located in the same position in the front-rear direction as the rearmost position P4 of the rear combination lamp 40. Alternatively, the rearmost position P3 of the undercover 60 may be located forward of the rearmost position P4 of the rear combination lamp 40.

In the vehicle side view, a front portion 65 of the undercover 60 has a large size in the upper-lower direction, and an upper edge 66 of the front portion 65 of the undercover 60 is formed in a gentle mountain shape. The front portion 65 of the undercover 60 slightly overlaps with a lower edge 46 of a front portion 45 of the rear combination lamp 40. The front portion 65 of the undercover 60 does not protrude outward in the vehicle width direction in an eaves shape, and covers the lower edge 46 of the front portion 45 of the rear combination lamp 40 from the outside. For this reason, the front portion 45 of the rear combination lamp 40 is protected from mud or the like scattering toward the front portion 45 of the rear combination lamp 40.

As described above, in the vehicle rear view (see FIG. 3), the pair of lamp portions 41 of the rear combination lamp 40 are spaced apart from each other in the vehicle width direction with a space therebetween. The space between the pair of lamp portions 41 is recessed, and thus it is difficult to remove mud and the like adhering to the recess. Further, mud or the like may spread from the recess to the periphery and adhere to the lamp portions 41. Although it is also conceivable to connect the pair of lamp portions 41 to eliminate the recess, the design of the rear combination lamp 40 would deteriorate. Therefore, a central portion 67 of the undercover 60 enters between the pair of lamp portions 41, and mud or the like is prevented from adhering between the pair of lamp portions 41 with the central portion 67.

In this way, the undercover 60 has a function of protecting the rear combination lamp 40, thereby reducing the size of the rear fender 29. At this time, the undercover 60 is formed in an elongated shape between the rear combination lamp 40 and the rear fender 29, and is inconspicuous in the vehicle rear view and the vehicle side view. Since the rear fender 29 is miniaturized and the undercover 60 has a small influence on the appearance of the vehicle, the protection performance of the rear combination lamp 40 is improved while preventing the deterioration of the appearance of the vehicle. The degree of freedom of the shape of the rear fender 29 is also ensured.

Further, in the vehicle side view (see FIG. 4), the lens surface 42 of the rear combination lamp 40 is inclined rearward from a lower edge toward an upper edge. An upper surface 68 of the undercover 60 is connected to the lower edge of the lens surface 42 of the rear combination lamp 40, and is inclined rearward from an upper edge toward a lower edge in the vehicle side view. In this way, the undercover 60 protrudes obliquely downward from the lower edge of the lens surface 42 of the rear combination lamp 40, and thus a radiation angle of the rear combination lamp 40 is ensured. Therefore, the protection performance of the rear combination lamp 40 is improved without reducing the visibility of the rear combination lamp 40.

Next, attachment configurations of members will be described. As shown in FIG. 5, a rear fender brace 35 is attached to rear ends of the pair of seat rails 14, and an arch-shaped support frame 36 is attached to the rear fender brace 35. A lamp housing 51 of the rear combination lamp 40 is attached to the support frame 36, and the lens surface 42 (see FIG. 2) of the rear combination lamp 40 is exposed to the outside from the lower cover 33. Below the lamp housing 51, the undercover 60 (see FIG. 2) is screwed to the lower cover 33 from the inside so that a screw head is prevented from exposure to the outside.

As shown in FIG. 6, the rear fender 29 is screwed to the lower cover 33 from below by bolts 75 in positions forward of the undercover 60. An attachment portion of the rear fender 29 is wide in the vehicle width direction, and a main body portion of the rear fender 29 is formed in a triangular shape. For this reason, it is possible to make the triangular exposed portion of the rear fender 29 slim while ensuring a wide attachment portion of the rear fender 29. Since the rear fender 29 is not attached to the undercover 60, the size of the undercover 60 can be reduced. In a vehicle bottom view, the rear combination lamp 40 is exposed to the outside of the undercover 60.

Figure 7:
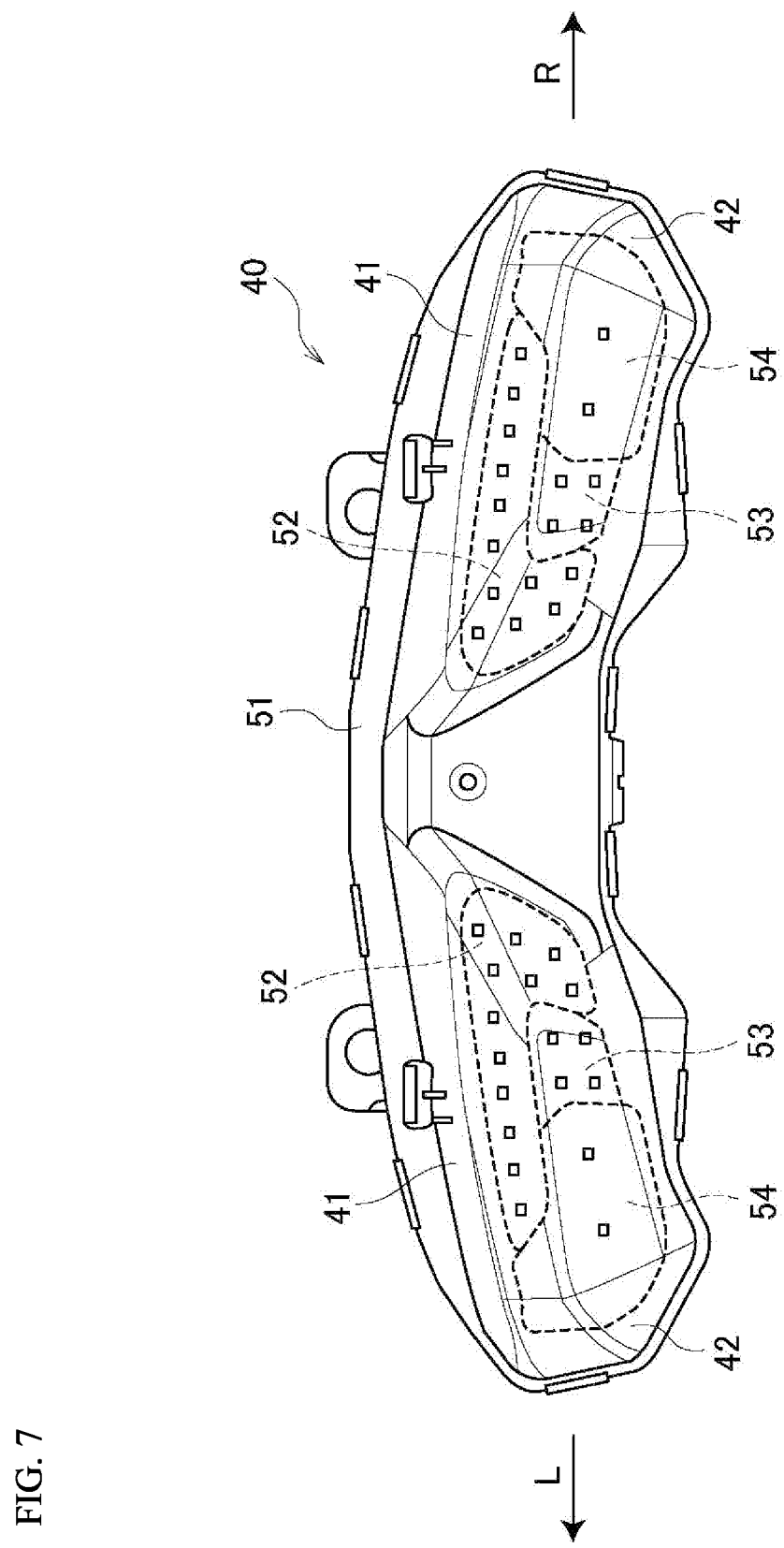
FIG. 7 is a front view of a rear combination lamp according to the present embodiment.
Figure 8:
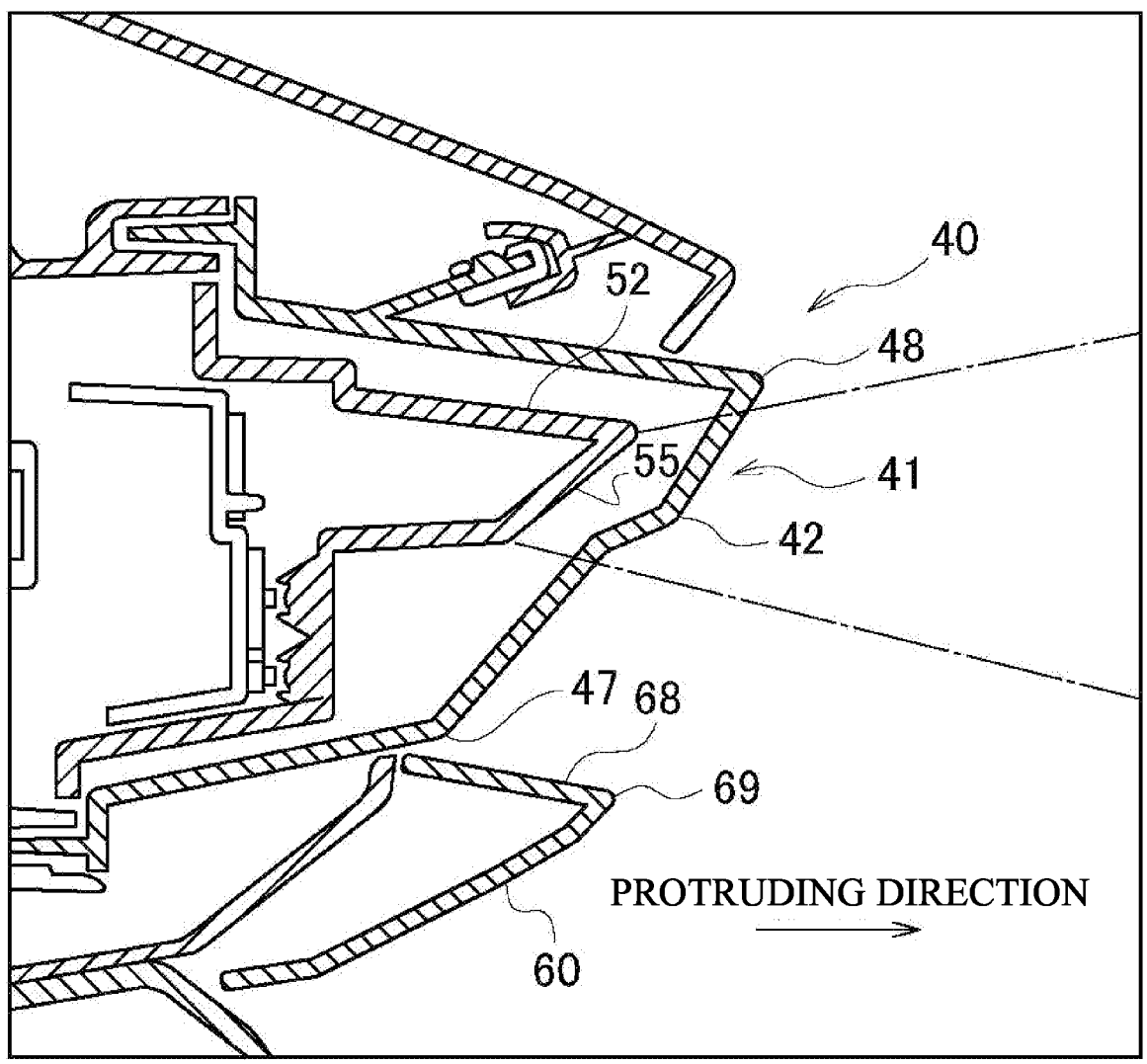
FIG. 8 is a sectional view of a part of the vehicle rear portion in FIG. 3.

The relationship between the radiation angle of the rear combination lamp and the undercover will be described with reference to FIGS. 7 and 8. FIG. 7 is a front view of the rear combination lamp according to the present embodiment. FIG. 8 is a sectional view of a part of the vehicle rear portion in FIG. 3.

As shown in FIG. 7, the lamp housing 51 of the rear combination lamp 40 is provided with the pair of lamp portions 41. A tail lamp 52, a stop lamp 53, and a turn signal lamp 54 are assembled inside the lens surface 42 of each of the lamp portions 41. The tail lamp 52 is formed in an L-shaped region in which one end portion of the lamp portion 41 near the vehicle center and an upper portion of the lamp portion 41 are connected. The stop lamp 53 is formed in a lower region adjacent to one end portion of the tail lamp 52. The turn signal lamp 54 is formed in a region near a vehicle outer side of the lamp portion 41 adjacent to the tail lamp 52 and the stop lamp 53.

The tail lamp 52 is turned on in darkness such as in the evening, both the tail lamp 52 and the stop lamp 53 are turned on during braking, and the turn signal lamp 54 is turned on when the vehicle changes its course or turns right or left. Since the tail lamp 52 is most frequently used among the three lamps 52, 53, and 54, the tail lamp 52 is installed at the upper portion of the lamp portion 41 that is separated upward from the undercover 60 (see FIG. 8). Since the tail lamp 52 is separated from the undercover 60, a radiation angle of the tail lamp 52 is not narrowed by the undercover 60 and the visibility of the tail lamp 52 is improved.

More specifically, as shown in FIG. 8, the lens surface 42 of the rear combination lamp 40 is inclined rearward from the lower edge 47 toward the upper edge 48. Therefore, the inner space of the lens surface 42 is widened rearward at the upper portion of the lamp portion 41. By installing the tail lamp 52 at the upper portion of the lamp portion 41, a light emitting portion 55 of the tail lamp 52 can be located further rearward and the undercover 60 can be separated from a radiation range of the tail lamp 52. Since the radiation angle of the tail lamp 52 is sufficiently ensured, it is possible to protrude the undercover 60 further rearward and improve the protection performance of the rear combination lamp 40.

The stop lamp 53 and the turn signal lamp 54 (see FIG. 7) are installed at a lower portion of the lamp portion 41 close to the undercover 60. However, the upper surface 68 of the undercover 60 is inclined rearward to be separated from the lens surface 42 of the rear combination lamp 40. For this reason, radiation angles of the stop lamp 53 and the turn signal lamp 54 would not be significantly narrowed by the undercover 60. In this way, the visibility of the tail lamp 52, the stop lamp 53, and the turn signal lamp 54 is ensured even when the rear combination lamp 40 is covered by the undercover 60 from below.

The undercover 60 is provided directly below the lens surface 42 of the rear combination lamp 40. The undercover 60 protrudes rearward from the lens surface 42 of the rear combination lamp 40, and a protruding end 69 of the undercover 60 is brought close to the upper edge 48 of the lens surface 42 in the protruding direction. For this reason, in the vehicle bottom view, most of the lens surface 42 of the rear combination lamp 40 is covered by the undercover 60, and the lens surface 42 is protected from mud or the like from below by the undercover 60. In this way, the visibility of the rear combination lamp 40 is ensured and the protection performance of the rear combination lamp 40 is improved.

As described above, according to the present embodiment, the rear combination lamp 40 is covered from below by the undercover 60 along the lower edge of the rear combination lamp 40. Even when the size of the rear fender 29 in the vehicle width direction is smaller than the size of the undercover 60 in the vehicle width direction, the rear combination lamp 40 is protected from mud or the like splashed by the rear wheel 28. By protecting the rear combination lamp 40 with the undercover 60 and reducing the size of the rear fender 29, deterioration of the appearance of the vehicle is prevented and the protection performance of the rear combination lamp 40 is improved.

In the present embodiment, the undercover protrudes obliquely downward from the lower edge of the rear surface of the rear combination lamp. However, the undercover may be formed as long as the undercover covers the rear combination lamp from below. For example, the undercover may protrude horizontally from the lower edge of the rear surface of the rear combination lamp.

In the present embodiment, the undercover covers the entire rear combination lamp. Alternatively, the undercover may protect at least the rear surface of the rear combination lamp. For this reason, the foremost position of the undercover may be located in rear of the foremost position of the rear combination lamp, or the front portion of the undercover may not overlap with the rear combination lamp.

The present embodiment described a rear combination lamp including a pair of left and right lamp portions with a space therebetween. However, the configuration of the rear combination lamp is not particularly limited.

The present embodiment described an example in which the rear combination lamp, the rear fender, and the undercover are separately formed. Alternatively, the rear combination lamp and the undercover may be integrally formed, or the rear fender and the undercover may be integrally formed.

The protection structure of rear combination lamp according to the present embodiment is not limited to the straddle-type vehicle of a tourer type, and may be adopted by straddle-type vehicles of other types. The straddle-type vehicle is not limited to a general vehicle on which a rider rides at a posture of straddling a seat. The straddle-type vehicle further includes a scooter-type vehicle on which a rider rides without straddling a seat.

As described above, according to the present embodiment, there is provided a protection structure of a rear combination lamp (40) provided at a rear portion of a straddle-type vehicle. The protection structure of the rear combination lamp includes an undercover (60) covering a rear combination lamp from below, and a rear fender (29) covering a rear wheel (28) from above. The rear fender is below the undercover. The undercover extends along a lower edge of the rear combination lamp. A size of the rear fender in a vehicle width direction is smaller than a size of the undercover in the vehicle width direction in a vehicle rear view. According to this configuration, the rear combination lamp is covered from below by the undercover along the lower edge of the rear combination lamp. Even when the size of the rear fender in the vehicle width direction is smaller than the size of the undercover in the vehicle width direction, the rear combination lamp is protected from mud or the like splashed by the rear wheel. By protecting the rear combination lamp with the undercover and reducing the size of the rear fender, it is possible to improve the protection performance of the rear combination lamp while preventing deterioration of the appearance of the vehicle.

In the protection structure of the rear combination lamp according to the present embodiment, the undercover protrudes obliquely downward from a lower edge (47) of a rear surface (lens surface 42) of the rear combination lamp. According to this configuration, a radiation angle of the rear combination lamp is ensured, and thus it is possible to improve the protection performance of the rear combination lamp without reducing the visibility of the rear combination lamp.

In the protection structure of the rear combination lamp according to the present embodiment, a foremost position (P1) of the undercover is in front of a foremost position (P2) of the rear combination lamp, and a rearmost position (P3) of the undercover is at the same position as or in front of a rearmost position (P4) of the rear combination lamp in a vehicle side view. According to this configuration, the rear combination lamp can be entirely protected by the undercover.

In the protection structure of the rear combination lamp according to the present embodiment, a foremost position of the undercover is in front of a foremost position (P5) of the rear fender in a vehicle side view. According to this configuration, it is possible to reduce the size of the rear fender while protecting the combination lamp.

In the protection structure of the rear combination lamp according to the present embodiment, a front portion (65) of the undercover overlaps the rear combination lamp in a vehicle side view. According to this configuration, the combination lamp can be protected from mud splash or the like from a lateral side.

In the protection structure of the rear combination lamp according to the present embodiment, the rear combination lamp includes a pair of left and right lamp portions (41) with a space therebetween. The undercover enters between the pair of left and right lamp portions in the vehicle rear view. According to this configuration, since the undercover enters between the pair of ramp portions, mud or the like splashed by the rear wheel is prevented from adhering between the pair of ramp portions.

In the protection structure of the rear combination lamp according to the present embodiment, a tail lamp (52) of the rear combination lamp is disposed above and apart from the undercover. According to this configuration, since the tail lamp that is frequently used is apart from the undercover, a radiation angle of the tail lamp is ensured and the visibility of the tail lamp is improved. Since the radiation angle of the tail lamp is ensured, the undercover can protrude further rearward and the protection performance of the combination lamp can be improved.

In the protection structure of the rear combination lamp according to the present embodiment, a frame cover (30) is connected to a front side of the rear combination lamp. The rear fender is attached to a lower surface (lower cover 33) of the frame cover in front of the undercover. According to this configuration, it is possible to reduce the size of the rear fender while ensuring an attachment position of the rear fender.

Although the present embodiment has been described, the above-described embodiment and modifications may be combined entirely or partially as other embodiment.

The technique of the present invention is not limited to the above-described embodiment, and various changes, substitutions, and modifications may be made without departing from the spirit of the technical idea of the present invention. The present invention may be implemented using other methods as long as the technical concept can be implemented by the methods through advance of the technology or other derivative technology. Therefore, the claims cover all embodiments that may be included within the scope of the technical concept.

What is claimed is:

1. A protection structure of a rear combination lamp provided at a rear portion of a straddle-type vehicle, the protection structure of the rear combination lamp comprising:
    an undercover covering the rear combination lamp from below; and
    a rear fender covering a rear wheel from above, the rear fender being below the undercover,
    wherein the undercover extends along a lower edge of the rear combination lamp,
    wherein a size of the rear fender in a vehicle width direction is smaller than a size of the undercover in the vehicle width direction in a vehicle rear view, and
    wherein a foremost position of the undercover is in front of a foremost position of the rear fender in a vehicle side view.

2. A protection structure of a rear combination lamp provided at a rear portion of a straddle-type vehicle, the protection structure of the rear combination lamp comprising:
    an undercover covering the rear combination lamp from below; and
    a rear fender covering a rear wheel from above, the rear fender being below the undercover,
    wherein the undercover extends along a lower edge of the rear combination lamp,
    wherein a size of the rear fender in a vehicle width direction is smaller than a size of the undercover in the vehicle width direction in a vehicle rear view, and
    wherein a foremost position of the undercover is in front of a foremost position of the rear combination lamp, and a rearmost position of the undercover is at the same position as or in front of a rearmost position of the rear combination lamp, in a vehicle side view.

3. A protection structure of a rear combination lamp provided at a rear portion of a straddle-type vehicle, the protection structure of the rear combination lamp comprising:
    an undercover covering the rear combination lamp from below; and
    a rear fender covering a rear wheel from above, the rear fender being below the undercover,
    wherein the undercover extends along a lower edge of the rear combination lamp,
    wherein a size of the rear fender in a vehicle width direction is smaller than a size of the undercover in the vehicle width direction in a vehicle rear view, and
    wherein a front portion of the undercover overlaps with the rear combination lamp in a vehicle side view.

4. A protection structure of a rear combination lamp provided at a rear portion of a straddle-type vehicle, the protection structure of the rear combination lamp comprising:
    an undercover covering the rear combination lamp from below; and
    a rear fender covering a rear wheel from above, the rear fender being below the undercover,
    wherein the undercover extends along a lower edge of the rear combination lamp,
    wherein a size of the rear fender in a vehicle width direction is smaller than a size of the undercover in the vehicle width direction in a vehicle rear view,
    wherein the rear combination lamp includes a pair of left and right lamp portions with a space therebetween, and
    wherein the undercover enters between the pair of left and right lamp portions in the vehicle rear view.

5. The protection structure of the rear combination lamp according to claim 2, wherein a tail lamp of the rear combination lamp is disposed above and apart from the undercover.

6. The protection structure of the rear combination lamp according to claim 1, wherein a frame cover is connected to a front side of the rear combination lamp, and the rear fender is attached to a lower surface of the frame cover in front of the undercover.

7. The protection structure of the rear combination lamp according to claim 2, wherein the undercover protrudes obliquely downward from a lower edge of a rear surface of the rear combination lamp.

8. The protection structure of the rear combination lamp according to claim 2,
    wherein a lens surface of the rear combination lamp is inclined rearward from a lower edge thereof toward an upper edge thereof,
    wherein the undercover protrudes rearward from the lower edge of the lens surface of the rear combination lamp,
    wherein a protruding end of the undercover is brought close to the upper edge of the lens surface in a protruding direction of the protruding end, and
    wherein the protruding end is located between the upper edge of the lens surface and the lower edge of the lens surface in the protruding direction.

9. The protection structure of the rear combination lamp according to claim 3,
    wherein, in the vehicle side view, an upper edge of a front portion of the undercover is formed in a mountain shape, and
    wherein the front portion of the undercover overlaps with a lower edge of a front portion of the rear combination lamp.

* * * * *